United States Patent
Stopler

(10) Patent No.: US 6,625,219 B1
(45) Date of Patent: Sep. 23, 2003

(54) METHOD AND APPARATUS FOR ENCODING/FRAMING FOR MODULATED SIGNALS OVER IMPULSIVE CHANNELS

(75) Inventor: Daniel Stopler, Holon (IL)

(73) Assignee: Tioga Technologies, Ltd., Tel Aviv (IL)

( * ) Notice: Subject to any disclaimer, the term of this patent is extended or adjusted under 35 U.S.C. 154(b) by 0 days.

(21) Appl. No.: 09/258,650

(22) Filed: Feb. 26, 1999

(51) Int. Cl.[7] ............................................... H03M 13/00
(52) U.S. Cl. .................................. 375/240.27; 714/758
(58) Field of Search ........................... 375/260, 240.24, 375/240.27, 267; 714/755, 758; 370/468, 479, 480

(56) References Cited

U.S. PATENT DOCUMENTS

| | | | |
|---|---|---|---|
| 5,923,679 A | * 7/1999 | Itoh et al. | 714/752 |
| 6,004,028 A | * 12/1999 | Bottomley | 714/758 |
| 6,034,996 A | * 3/2000 | Herzberg | 375/265 |
| 6,405,338 B1 | * 6/2002 | Sinha et al. | 714/752 |

OTHER PUBLICATIONS

Michael Grimwood and Paul Richardson, "S–CDMA as High–Capacity Upstream Physical Layer," *IEEE*, 802.14A/98–016, Jun. 15, 1998.

* cited by examiner

Primary Examiner—Stephen Chin
Assistant Examiner—Kevin Kim
(74) Attorney, Agent, or Firm—Darby & Darby

(57) ABSTRACT

An encoding/framing scheme for multitone modulation over impulsive channels which allows efficient operation in multipoint to point channels which are affected by ingress (narrowband noise) and impulsive (burst) interference. The coding is achieved using a concatenated approach, with the inner code being Trellis Coded Modulation (TCM), using, for example, convolutional coding, and the outer code being a Reed Solomon (RS) code. Two dimensional interleaving is performed, with one dimension being time, and the other dimension being frequency (tones or sub-channels). The TCM coding provided by the present invention is quite effective in dealing with impulse noise effects. The interleaving may be applied in two levels. According to one embodiment, user data is RS encoded, and a portion of the RS encoded data is interleaved and filled along columns for transmission using a multitone transmission system. The remaining portion of the RS encoded user data is then TCM encoded, interleaved and effectively filled along rows for subsequent transmission. In another embodiment, a portion of the user data is RS encoded, interleaved and filled along columns for transmission, while the remaining portion of the user data is instead TCM encoded, interleaved and effectively filled along rows for subsequent transmission. A diagonalization scheme is also used to provide immunity against impulse noise, while at the same time allowing for a simple method of utilizing tones of different loading. According to the diagonalization principle, data packets are spread over time in a diagonal fashion, such that an impulse noise affects more than one user's packets, with the effect on each being reduced. In this way, a code having lower redundancy can be used since the amount of corruption expected in one user's data packet will be reduced.

42 Claims, 6 Drawing Sheets

METHOD AND APPARATUS FOR ENCODING/FRAMING FOR MODULATED SIGNALS OVER IMPULSIVE CHANNELS

FIELD OF THE INVENTION

The present invention generally relates to the field of data communications and processing. Specifically, the present invention relates to a method and apparatus for encoding/framing a data stream of multitone modulated signals to improve impulse burst immunity.

BACKGROUND OF THE INVENTION

Digital data communications systems are commonly used to transmit and/or receive data between remote transmitting and receiving locations. A central facet of any data communications system is the reliability and integrity of the data which is being communicated. Ideally, the data which is being transmitted from the transmitting location should be identical to the data which is being received at the receiving location. Practically however, the data to the data which is being received at the receiving location. Practically however, the data which is received at the receiving location has oftentimes been corrupted with respect to the original data that was transmitted from the transmitting location. Such data communication errors may be attributed in part to one or more of the transmission equipment, the transmission medium or the receiving equipment. With respect to the transmission medium, these types of data errors are usually attributed to the less than ideal conditions associated with the particular transmission medium. An example of such a communication medium or channel is the hybrid fiber coaxial cable television network, HFC CATV.

In certain channels, such as the HFC channel, errors may be caused by noise or other interference. One type of noise is ingress or narrowband interference which typically occurs at a fixed frequency and lasts for a long time. Another type of noise is impulse or burst interference which typically occurs at unexpected times, lasts for a short period of time (e.g., several microseconds), and corrupts all tones or bands.

Multitone modulation is a signal transmission scheme which uses a number of narrow-band carriers positioned at different frequencies, all transmitting simultaneously in parallel. Each narrow band carries a fraction of the total information being transmitted. The discrete bands or sub-channels are independently modulated, and each have a carrier frequency at the center frequency of the particular band.

One type of multitone transmission scheme is discrete multitone, often referred to as DMT. In DMT, a 1.1 MHz channel is broken down into 256 sub-channels or bands, each of which is 4 KHz. Each of the sub-channels has its own carrier frequency, and the signal to noise ratio for each of the sub-channels is monitored by the DMT system to determine how many bits per signal may be carried in each of the sub-channels. Each of the sub-channels transmits a number of information bits in a single symbol or signal period. The number of bits per signal (or symbol) in a sub-channel is typically referred to as the "loading" of the sub-channel. The DMT system dynamically adjusts the loading of each of the sub-channels in accordance with the noise characteristics of the sub-channel. Particularly noisy sub-channels may sometimes not be used altogether.

DMT typically has long symbol periods of 250 microseconds. As a result, DMT exhibits fairly good immunity with respect to time domain events, since the effect of a time domain event will be averaged out over the relatively long symbol period. In this way, impulse noise has less of an effect on DMT transmissions. Although the effect is reduced, there is nevertheless, still an adverse effect due to impulse noise. With respect to narrowband interference, this type of noise is typically stable and can be compensated for by adjusting the loading of the particular, affected sub-channels.

Variable Constellation Multitone (VCMT) modulation is a transmission scheme specifically designed to effectively combat the high ingress and burst impairments in cable TV channels, and also to maximize the throughput capacity of such channels. VCMT uses variable bit loading per tone, along with coding and interleaving. The tones are independently modulated from QPSK (quadrature phase shift keying) to 256-QAM (quadrature amplitude modulation), depending on the noise measured for each tone. The SNR (signal to noise ratio) across the channel is monitored for each tone, and the headend receiver accordingly instructs the upstream transmitter in the cable modem to modify the QAM constellation for each tone to maintain a desired BER (bit error rate).

VCMT also utilizes spectral shaping to reduce the frequency sidelobes of the tones, as compared with conventional multitone modulation, in order to reduce the effect of narrowband interference to only those affected tones. As with all multitone modulation schemes, VCMT utilizes long symbol periods to average the effect of burst and impulse noise. Interleaving the data over time and frequency may also be used to minimize the number of impaired tones for each user.

The VCMT nominal configuration is designed for a bandwidth of 1.6 MHz. However, the VCMT configuration may be adapted for any particular bandwidth through proper modification of the system parameters. In the case of the nominal configuration, VCMT uses the following parameters:

| | |
|---|---|
| RF Bandwidth: | 1.6 MHz. |
| Number of tones: | 36 |
| Modulation: | QPSK to 256-QAM (per tone) |
| Inter-tone spacing: | 43.75 KHz. |
| Signaling rate: | 40 kbaud (per tone) |
| Data rate: | Variable, depending on tone modulation |
| Symbol shaping: | Modified square-root-raised-cosine, roll-off 0.09 |
| Symbol duration: | 10 symbol periods (250 microseconds) |

Code Division Multiple Access (CDMA) modulation is a multi-user access transmission scheme in which different users overlap both in frequency and in time. This is in contrast to Frequency Division Multiple Access (FDMA) in which users overlap in time, but are assigned unique frequencies, and Time Division Multiple Access (TDMA) in which users overlap in frequency, but are assigned unique timeslots. According to CDMA, each user is assigned a unique code sequence that allows the user to spread its information over the entire channel bandwidth, as opposed to particular sub-channel(s) in FDMA. Thus, signals from all users are transmitted over the entire channel. To separate out the signals for a particular user at a receiver, cross correlation is performed on the received signal using the unique user code sequence. In CDMA systems, inter-user interference is minimized using one of two possible techniques.

The first technique for minimizing inter-user interference is to modulate the user signals using an orthogonal basis of wideband functions, e.g., Walsh basis. Specifically, at a given instant in time, each user selects (according to its unique code) a different basis function from the orthogonal basis, ensuring zero cross correlation between the different users. The, basis function used by each user may be changed on a symbol by symbol basis, while still ensuring that different users use different functions. The orthogonal basis itself may be changed on a symbol by symbol basis. The result is that each user occupies the entire channel bandwidth, while user cross correlation is kept to zero. The disadvantage of this approach is that in order to build a wideband (and frequency overlapping) orthogonal basis, the user data generally needs to be time synchronized since the orthogonal base construction assumes time synchronization.

A second technique for minimizing inter-user interference which does not require that the user data be time synchronized is to modulate each symbol using a pseudo randomly selected wideband waveform, which is selected according to the unique code for each user. The wideband waveform may be generated by multiplying the user data by a pseudo random sequence, referred to as a spreading sequence. This approach minimizes inter-user interference, but does not reduce the interference to zero. However, the lower the signaling rate (baud rate) is versus its bandwidth, the lower the cross correlation will be. Thus, in CDMA the signaling rate of each user is usually much smaller than the channel bandwidth it occupies in order to make the inter-user interference manageable. Typically, a ratio of 1/100 or less is common.

The above two methods for minimizing inter-user interference may be combined, for example, when it is possible to group users, such that time synchronization exists within a group, although time synchronization may not exist across groups.

CDMA transmission is well known to those of skill in the art. A comparison between CDMA and FDMA/TDMA may be found in Proakis, "Digital Communications", Chapter 15, which is incorporated herein by reference. Also, an example of the combination of the above two approaches for minimizing inter-user interference (i.e., combining a Walsh basis within a group and a spreading sequence across groups) may be found in TIA/EIA/IS-95 "Mobile Station Compatibility Standard for Dual Mode Wideband Spread Spectrum Cellular System", which is incorporated herein by reference.

The multitone transmission schemes described above, DMT, VCMT and CDMA, may be conceptually viewed as a two-dimensional matrix, with time as the horizontal axis and frequency as the vertical axis. In the presence of ingress (narrowband interference), in the case of CDMA, all codes are corrupted by the ingress, while in VCMT, a single row (or tone) is corrupted, and in DMT, the ingress affects primarily a single row (or tone) with a much lesser effect on adjacent rows. In the presence of impulse (burst interference), the effect on CDMA and DMT is the corruption of a single symbol, while the effect on VCMT is the corruption of primarily a single symbol.

To overcome these problems, data communications systems often rely on error detection and error correction schemes, to detect the occurrence of a data error and to correct a data error, respectively. One simple form of error detection is the use of a parity bit associated with each block of data to indicate whether the particular block contains an odd or even number of 1 bits. However, this is a very simple scheme which has numerous disadvantages. It is a simple type of error detection scheme which is capable of accurately detecting up to one bit error per data block. Moreover, the use of a parity bit cannot detect the occurrence of two bit errors in a data block, since this is not even detected as a parity violation. Additionally, the use of a parity bit only detects errors; it cannot correct errors. Any time that an error is detected, the receiving location typically requests retransmission of the particular data block from the transmitting location.

One type of error correction scheme commonly used in data communications systems is the use of redundant data transmissions and a voting circuit at the receiving location. In such a system, the data being transmitted is repeated a number of times, such as five. At the receiving location, all five data blocks are received and processed by a voting circuit which compares the five received versions of each data bit and determines the bit to be a 1 or 0 based on the voting consensus. Although such a system is capable of detecting and correcting data errors, it does so at a great cost in terms of the effective data throughput or transmission rate. This is due to the fact that each data block must be repeated a number of times.

The above-mentioned correction/detection schemes are examples of binary block codes. Specifically, an (n,k,d) binary block code is a set of $2^k$ binary codewords of block length n and minimum distance d (i.e., coding distance). The transmitted data is partitioned into binary blocks of length k, then each block is mapped into a binary codeword of length n, which is then modulated and transmitted through the channel, or sub-channels in the case of multiple sub-channels, such as in DMT or VCMT. This block code is capable of correcting up to $t=(d-1)/2$ errors within each codeword.

As mentioned above, there are cases where channel errors occur in non-frequent bursts, the length of which exceeds the error correction capability of the code. These cases are handled by interleaving the data stream before it is modulated and transmitted through the channel. Functionally, an interleaver is a memory device which is used to rearrange and separate the codewords or frames which are to be transmitted. Although certain aspects of the present invention are described by way of reference to interleavers, such as block interleavers, it should be understood that any type of interleaving, such as for example, convolutional interleaving, may be used. The terms codeword and frame are used interchangeably herein where a frame includes only one codeword. Instead of transmitting a succession of complete codewords, the interleaver allows the transmission of a portion (such as a byte) of a first codeword, followed by a portion of a second codeword, and so on. Henceforth, these portions will be referred to as either symbols or codeword symbols. In this way, if an error burst occurs during transmission, the error burst will not be localized to one particular frame. Rather, the errors will be spread across several codewords. If the errors were completely within one codeword, they may exceed the number of errors which the system can inherently correct for by the use of a block code. By spreading the data errors across several blocks, the number of errors within each block may be reduced to the point where the system is capable of correcting the data errors.

In a simple interleaver, data is written into the memory in columns and then read out in rows for subsequent transmission. At the receiver end, the received data is written into a de-interleaver in rows and then read out in columns. The interleaver rearranges the data within the codewords, and the de-interleaver essentially performs the reverse process to reconstruct the codewords for subsequent use. In this type of interleaver, all the data write operations are carried out as a group, and then the data read operations are carried out as a group. This type of interleaving, referred to as block interleaving, introduces latency of one block at the transmitter and one block at the receiver, due to the fact that a complete block has to be written before it can be read.

SUMMARY OF THE INVENTION

The present invention is for an encoding/framing scheme for multitone modulation over impulsive channels. The encoding/framing scheme allows efficient operation in multipoint to point channels which are affected by ingress (narrowband noise) and impulsive (burst) interference. The coding is achieved using a concatenated approach, with the inner code being Trellis Coded Modulation (TCM), using, for example, convolutional coding, and the outer code being a Reed Solomon (RS) code. Two dimensional interleaving is performed, with one dimension being time, and the other dimension being frequency (tones or sub-channels). In contrast to conventional coding schemes, the TCM coding provided by the present invention is quite effective in dealing with impulse noise effects. The present invention is also for a two level interleaving approach, in which different interleaving is performed on different levels. According to one embodiment of the present invention, the user data is RS encoded, and a portion of the RS encoded data is interleaved and filled along columns for transmission using a multitone transmission system. The remaining portion of the RS encoded user data is then TCM encoded, interleaved and effectively filled along rows for subsequent transmission. In another embodiment according to the present invention, a portion of the user data is RS encoded, interleaved and filled along columns for transmission, while the remaining portion of the user data is instead TCM encoded, interleaved and effectively filled along rows for subsequent transmission. The actual filling of the TCM encoded data may be performed along columns; however, the interleaving essentially introduces a reversal between columns and rows, such that the effective filling of data is along rows. In addition to the reversal of columns and rows, the interleaving also introduces time separation of symbols, which is a function of the interleaver depth.

The advantage of this approach is that the RS code symbols are filled in columns, while the TCM codewords are filled in rows. The first effect is that the number of RS bytes that are impacted by an impulse is reduced. Otherwise, an impulse could affect a larger number of RS bytes if they were filled in rows. Although the impacted RS bytes might be more severely impacted, due to the nature of the RS coding, it does not matter whether the RS byte is corrupted by one bit or by many bits. Thus, the advantage of the present invention is reducing the total number of RS bytes which contain any corrupted bits. The second effect is that the TCM codewords are filled in along rows, which in the case of an impulse, reduces the number of bits corrupted in each corrupted codeword. Again, because of the nature of the TCM coding, it is preferable to reduce the maximum number of corrupted bits likely to be experienced, in order to reduce the coding redundancy required of all codewords.

The present invention is also for a diagonalization scheme which provides immunity against impulse noise, while at the same time allowing for a simple method of utilizing tones of different loading. According to the diagonalization principle, data packets are spread over time in a diagonal fashion, such that an impulse noise affects more than one user's packets, with the effect on each being reduced. In this way, a code having lower redundancy can be used since the amount of corruption expected in one user's data packet will be reduced.

The present invention will become more apparent from the following Brief Description of the Drawings and Description of Preferred Embodiments.

DESCRIPTION OF PREFERRED EMBODIMENTS

Figure 1:
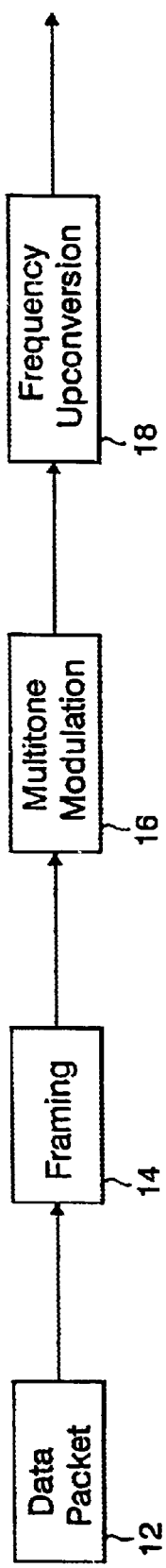
FIG. 1 is a block diagram of a multitone modulation data transmission system.

FIG. 1 shows a block diagram of a multitone modulation system. Such a system may be used in a multipoint to point channel, in which the communication channel is shared between users (stations), using, for example, Time Division Multiple Access (TDMA). A TDMA system allocates discrete amounts of the frequency bandwidth to each user, allowing many simultaneous conversations or connections. In a TDMA system, each user is assigned a specific timeslot for transmission of the data packets associated with that user. The "packet" is the user transmission unit of data. Referring now to FIG. 1, a data packet 12 is processed by a framing block 14 which performs the coding and interleaving functions used to improve immunity against interference. The packets processed by the framing block 14 are passed to the multitone modulation block 16 which performs the multitone modulation, as described in detail below, and generates a baseband multitone signal. The baseband multitone signal is then passed to frequency upconversion block 18 which converts the baseband signal to its assigned frequency band.

The present invention concatenates TCM inner coding and RS outer coding. Specifically, in the TCM coding, signal space is partitioned into cosets encoded by a rate ½ convolutional encoder. TCM coding is very efficient in white noise channels. As a result, it efficiently utilizes the spreading effect of impulse energy between tones, assuming proper interleaving. Although the input noise may not be pure white noise, but may in fact be colored, the adaptive, per-tone bit loading effectively provides white noise conditions for the coset encoding.

The RS outer coding provides additional protection against noise. It is mostly effective against strong impulses which have penetrated to the TCM parallel transitions layer. Due to the high performance of the TCM coding and the long symbols used in VCMT, it is possible to use RS coding with lower redundancy.

In accordance with the two dimensional interleaving according to the present invention, coded data is time interleaved and assigned to tones in a way which evenly divides the effect of ingress and impulse noise over multiple codewords and among multiple users. First, inter-user interleaving is performed using a diagonal structure to assign tones among different users. The diagonalization scheme complements the inherent multitone immunity to impulse noise. As a result, impulse energy is divided between tones, and tones are assigned to different users. Intra-user interleaving is used to interleave codewords within a packet in a way which divides the interference effect between codewords, while keeping the RS symbols aligned (columnwise) with the impulse interference. This alignment approach makes use of the RS code's efficient burst handling capabilities.

Figure 2:
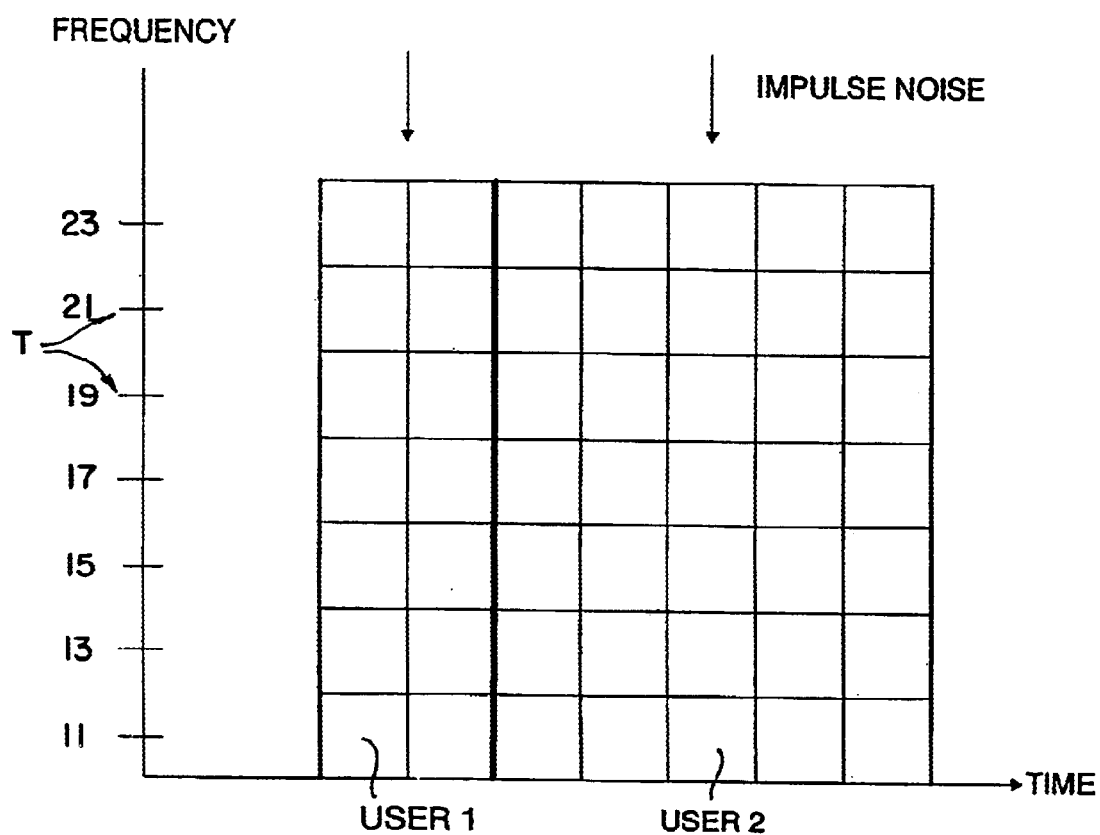
FIG. 2 is an illustration of multitone data transmission as a function of time.

FIG. 2 illustrates a multitone modulation scheme utilizing TDMA. A number of tones T are positioned at different frequency bands along the vertical frequency axis. Data packets are transmitted in a time-wise fashion along the horizontal time frequency axis. In the specific example shown in FIG. 2, User 1 is allocated two timeslots, while User 2 is allocated five timeslots following the transmission of User 1. The presence of impulse noise will act to corrupt a column of data. Because impulse noise has the potential to corrupt a very high percentage of data for a particular user, the data for all users must be encoded using a high degree of redundancy in the event that it is corrupted. This approach is extremely inefficient in that user data for all users must be encoded to have a very high degree of compensation when only a small number of users are likely to have their data corrupted.

Figure 3A:
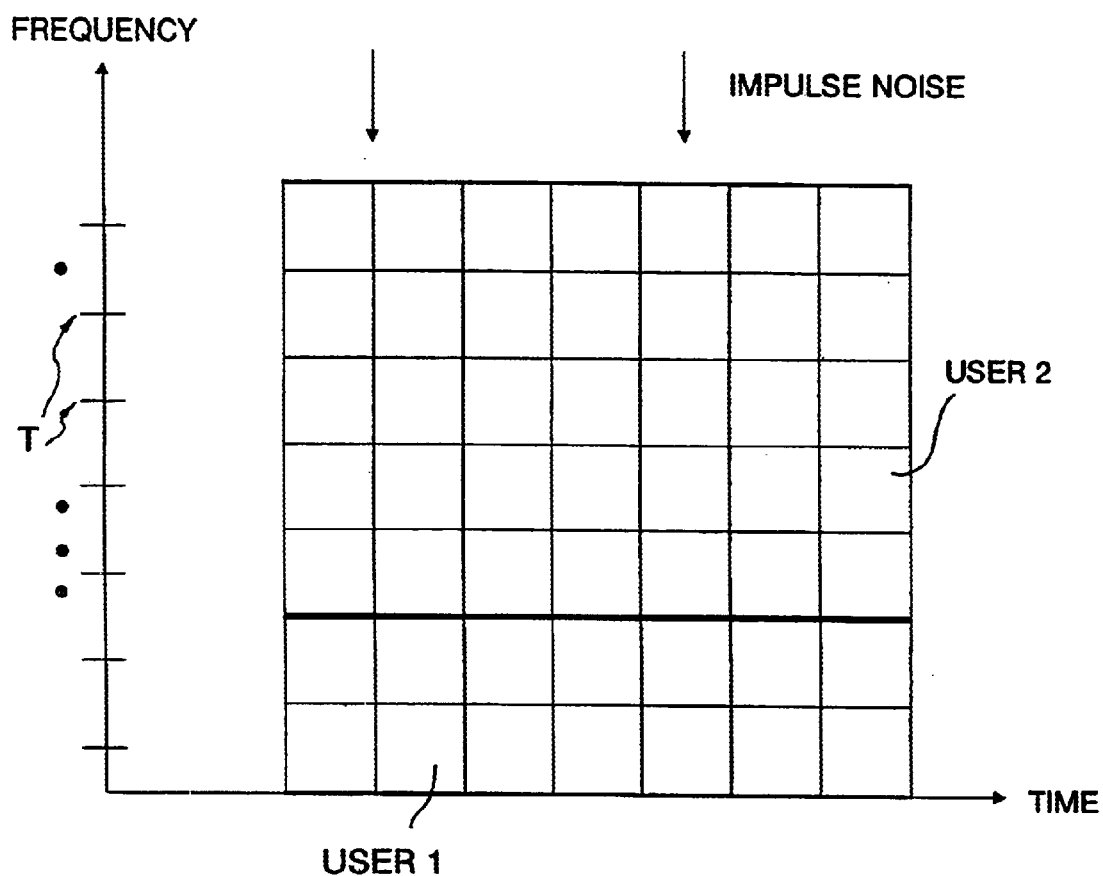
FIG. 3A is an illustration of multitone data transmission as a function of time, with rows and columns interchanged, for the case of uniform tone loading.

One approach to reducing the effect of impulse noise is shown in FIG. 3A, in which the columns and rows are essentially switched. Reducing the effect of impulse noise will result in a reduction in the amount of encoding or compensation that is required to effectively deal with expected noise events. As shown in FIG. 3A, each timeslot along the horizontal time axis is split among users. The tones T in FIG. 3A are assumed to all have the same bit loading. The specific example shown in FIG. 3A illustrates two "timeslots" for two users, User 1 and User 2. As a result, the effect of any impulse noise will be split among different users, and will not be concentrated on the data of a single user. Essentially, the corrupted data is distributed more evenly among users, thus reducing the maximum percentage of corrupted data which is likely to be experienced. As a result, the required coding redundancy or compensation necessary to deal with expected errors may be reduced. This is in contrast to the approach illustrated in FIG. 2, in which case the impulse noise may be completely targeted on the data of a single user, resulting in a large number of errors, thus requiring a high degree of redundancy or compensation in the coding of all user data.

Although the approach of FIG. 3A may increase noise immunity, it still has its disadvantages. Specifically, the switching of columns and rows is only practical for multitone transmission systems in which the individual tones all have the same loading. In the simplistic example of FIG. 2, User 1 is transmitting an amount of data corresponding to seven sub-channels for two time intervals. Similarly, User 2 is transmitting an amount of data corresponding to the same seven sub-channels, but for five time intervals. When the rows and columns are reversed, as in FIG. 3A, the amount of data for User 1 now corresponds to the first two sub-channels, but for a longer period of time. Similarly, the amount of data for User 2 corresponds to the next five sub-channels, for the same period of time. This limitation, i.e., uniform loading, is required so that the system can be easily and practically implemented with uniform sized rectangles, so that in this example, the data transmitted by seven sub-channels for two time periods, would be the same amount of data as that transmitted by two sub-channels for seven time periods. Of course, the system may be implemented with nonuniform tone loading; however, the system must then have to contend with irregularly shaped rectangles.

Figure 3B:
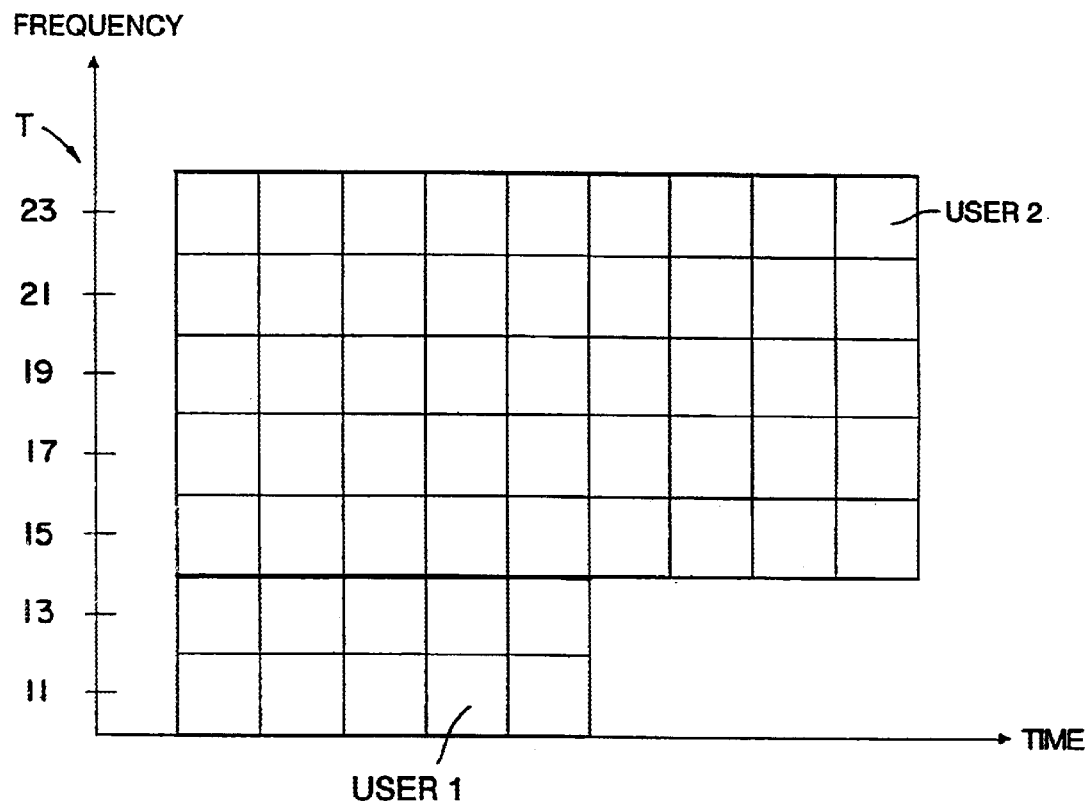
FIG. 3B is an illustration of multitone data transmission as a function of time, with rows and columns interchanged, for the case of nonuniform tone loading.

The application of the principles of FIG. 3A (i.e., switching of columns and rows) in the case of nonuniform bit loading is illustrated in FIG. 3B. For this illustration of nonuniform bit loading, it is assumed that tones 11 and 13 have bit loading of 2, while tones 15, 17, 19, 21 and 23 have bit loading of 1. Thus, in the original case of FIG. 2, User 1 data will correspond to tones 11 and 13 (two bits each) for two time periods, or eight bits, plus tones 15, 17, 19, 21 and 23 (one bit each) for two time periods, or 10 bits, for a total of 18 bits. Similarly, the data for User 2 will correspond to tones 11 and 13 (two bits each) for five time periods, or 20 bits, plus tones 15, 17, 19, 21 and 23 (one bit each) for five time periods, or 25 bits, for a total of 45 bits. Thus, if the rows and columns are reversed, as shown in FIG. 3B, User 1 is now assigned tones 11 and 13 (two bit loading for each), which require five time periods to transmit the 18 bits for User 1. Similarly, User 2 is assigned tones 15, 17, 19, 21 and 23 (one bit loading for each), which require nine time periods to transmit the 45 bits for User 2. As a result, the system must contend with irregular shaped rectangles, as shown in FIG. 3B.

Figure 4:
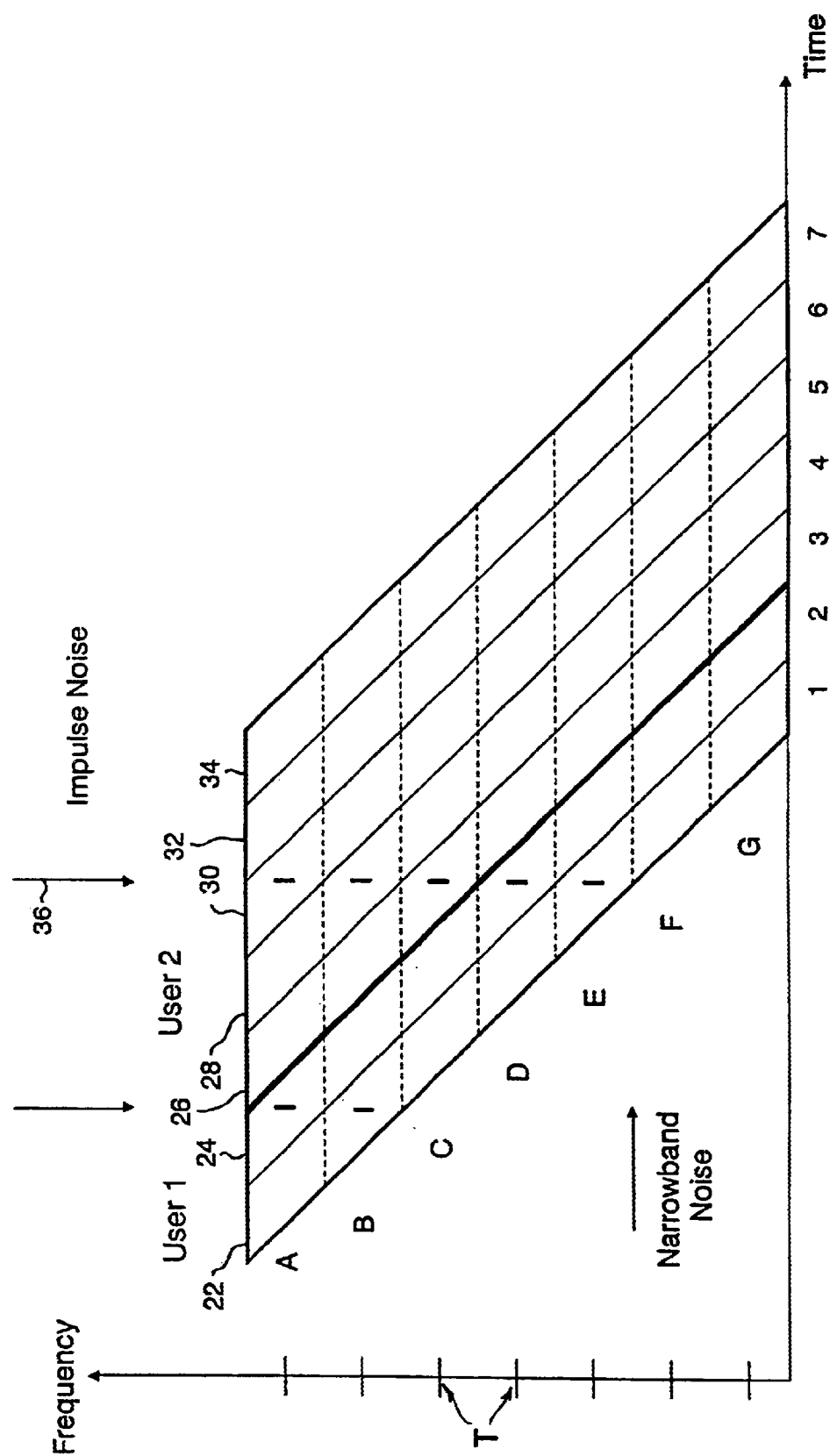
FIG. 4 is an illustration of diagonalization in accordance with the present invention for multitone data transmission as a function of time.

The present invention solves the above problem by utilizing the diagonalization principle illustrated in FIG. 4. As shown in FIG. 4, a frequency (sub-channel) versus time mapping is used to transmit the data packets for the different users. The specific mapping shown in FIG. 4 is a linear frequency versus time mapping having a slope of 1, i.e., the tone index is incremented by one for each successive symbol time period. Other slopes may be used in accordance with the principles of the present invention. In the illustrated example, the data packet for User 1 consists of two diagonals 22, 24, while the data packet for User 2 consists of five diagonals, 26, 28, 30, 32 and 34. Because the data for the different users is spread out in time, the effect of impulse noise is also similarly spread out. For example, the impact of impulse noise 36 will be spread out over both User 1 and User 2. The advantage of this approach is that the amount of corrupted data that any one user is expected to experience is decreased. As a result, the level of redundancy or compensation required in the coding for such data is also reduced, thereby reducing the inefficiency and overhead associated with proper data transmission. More importantly, the present invention provides added immunity against impulse noise, while at the same time allowing for the simple and easy use of differently loaded sub-channels. As shown in FIG. 4, the same tones are used for the users as in the approach of FIG. 2, just that the output of the tones is spread out over time.

Figure 5:
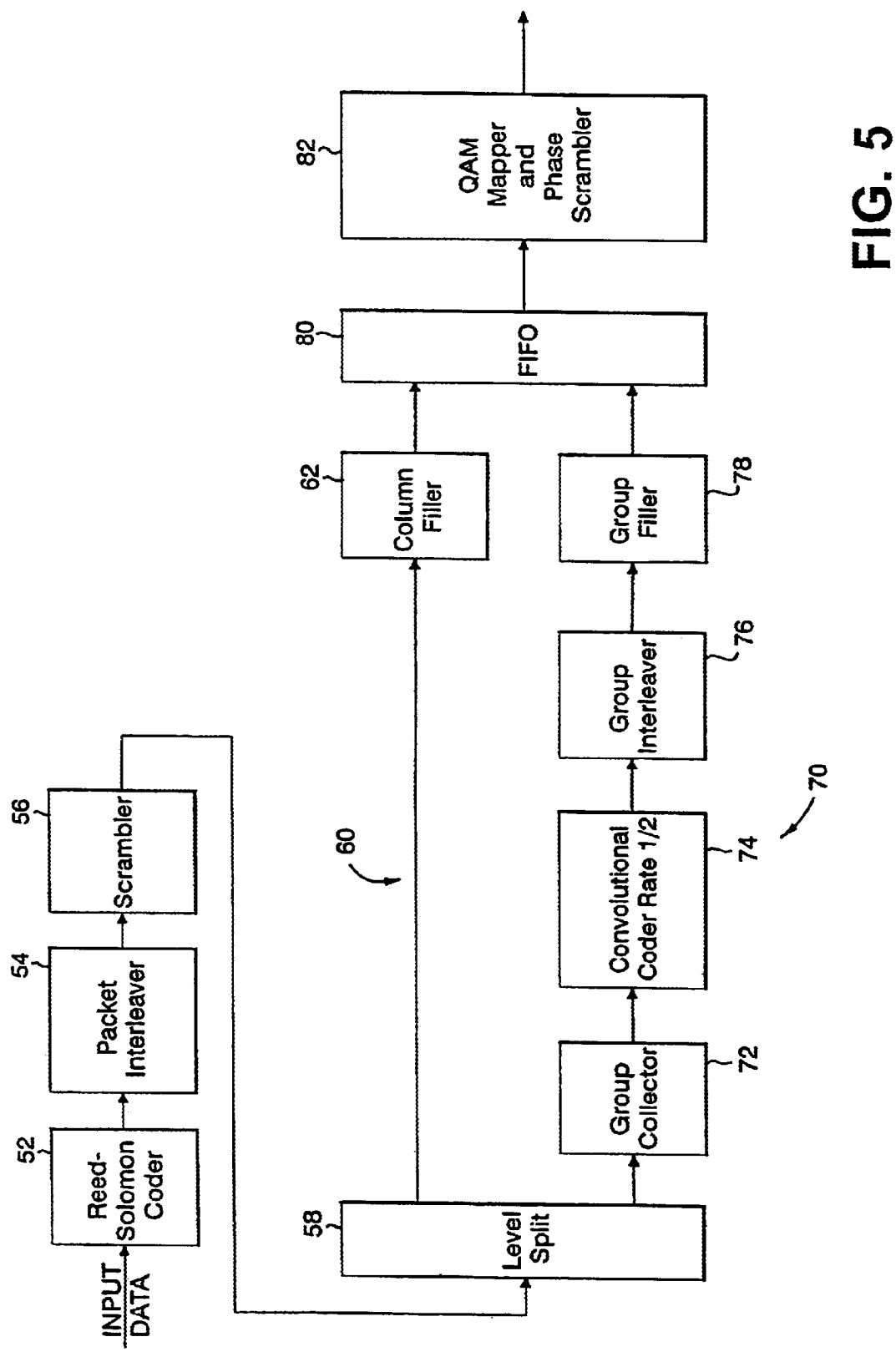
FIG. 5 is a block diagram of the framing approach of the present invention.

A block diagram of the framing scheme according to the present invention is shown in FIG. 5. As shown in FIG. 5, the input data, for example, in the form of data packets, is input to an RS coder 52. The RS coder 52 may, for example, utilize a polynomial over GF(256) (Galois Field) as defined in the DOCSIS/MCNS standard, i.e., $x^8+X^4+X^3+x^2+1$. The codeword size for the RS coder 52 may be programmable, as is T, the number of corrected errors, with T being in the range of 1 to 10. Alternatively, there may be no FEC coding at all.

The DOCSIS standard is the Data Over Cable Service Interface Specification, Radiofrequency Interface Specification, SP-RFI-102-971008 and SP-RFI-I04-980724, published by Cable Television Laboratories, Inc., 400 Centennial Drive, Louisville, Colo. Reference is also made to the present inventor's Variable Constellation Multitone Modulation (VCMT) Proposal for High Capacity Upstream Physical Layer, Project IEEE 802.14a HI_PHY Study Group, Document #IEEE 802.14a/98-013, available from the IEEE (Piscataway, New Jersey), the contents of which are hereby incorporated by reference.

The data output by the RS coder 52 is then input to an interleaver 54. The interleaver stage 54 may be optional, dependent on a number of factors, including packet size. Generally, it is advantageous to perform packet interleaving only if the data packet includes more than one RS codeword. The interleaver 54 may be a packet interleaver, such as a byte-wise block interleaver which functions to interleave RS symbols between codewords. The interleaver 54 is generally used when the packets contain multiple RS codewords, i.e., sufficiently large packets, such as 1 kbit or more. The interleaver input is X(n), for n=0, , , (N-i), where N is the block size in bytes. The interleaver output Y(n) is as follows (from left to right), with "J" being a programmable parameter:

| X(0) | X(J) | X(2*J) | ... | X(floor(N/J)*J) |
|---|---|---|---|---|
| X(1) | X(1 + J) | X(1 + 2*J) | ... | X(1 + floor((N − 1)/J*J) |
| ... | | | | |
| X(J − 1) | X(2*J − 1) | ... | | X(J − 1 + floor((N − (J − 1))/J)*J) |

The output bytes, Y(n), are serialized msb first. If the interleaver is polled after its input has been exhausted, it then outputs zeros.

The data output by the interleaver 54 is rearranged into a serial bit stream (MSB first) and then scrambled in scrambler 56, which is used to randomize the coded and interleaved data. Scrambler 56 may, for example, be implemented in accordance with the scrambler defined in the ADSL (Asymmetric Digital Subscriber Line) specification, TIEI.4/98-007R1, promulgated by the American National Standards Institute (ANSI) (1998). The scrambler may be defined by a 15-bit polynomial, such as $x^{15}+x^{14}+1$, with a programmable seed. The scrambler 56 may be effectively bypassed by using a seed of zero. The scrambler 56 generates a randomizing sequence according to the rule: $DS(n)=DS(n-14) \oplus DS(n-15)$. The serialized bit stream from the interleaver 54 is XORed with DS(n). Specifically, data bit "n" is XOR'd with DS(n).

The data output by the scrambler 56 is then divided by level splitter 58 into the two levels of the TCM encoder. If the system utilizes only RS coding, all the data bits are assigned to the upper level 60, and the lower level 70 is disabled. Splitter 58 essentially divides the serial bit stream into a group of data bits to be processed by the lower level 70, and the remaining data bits to be processed by the upper level 60. The number of bits assigned to the lower level 70 corresponds to one bit for each of the symbols in the packet for the particular user. Thus, in the case of the example illustrated in FIG. 4, 14 bits would be assigned to the lower level 70 for the packet of User 1, while 35 bits would be assigned to the lower level 70 for the packet of User 2. The actual number of assigned, usable bits may be reduced due to overhead signals, such as pilot tones. To simplify the implementation of the system, the lower level bits may be selected as the first bits in the serial bit stream. Alternatively, any selection scheme may be used; however, this would increase system complexity in terms of keeping track of the particular bits in the serial data stream.

In the upper level 60 of the TCM encoder, data bits are assigned to parallel transitions in a column-wise fashion by column filler 62. Essentially, a two dimensional matrix is filled, with the row index being tone frequency (vertical axis, FIG. 4) and the column index being symbol time (horizontal axis, FIG. 4). The mapping is performed column by column, proceeding from top to bottom (decreasing tone frequency). The leftmost column is filled first, and the rightmost column is filled last (increasing time). At each location, an m-tuple is placed according to the corresponding constellation rule (or bit loading) for the particular tone. Because only parallel transitions are mapped, m=(tone bit loading-2). The "−2" term takes account of the fact that the group filler, discussed below, inserts two bits into each location. Certain matrix elements are used to transmit overhead bits, instead of user payload data. The column filler 62 operates to fill in the symbols in absolute vertical columns, regardless of whether diagonalization is being used. The column filler 62 fills in columns, stopping only at packet boundaries between users, i.e., at the end of a time slot for a particular user.

Referring to the specific example of FIG. 4, let the rows be labeled A through H, with A being the top row, and H being the bottom row. Similarly, let the diagonals be labeled 1 through 7, with 1 being the left most diagonal, and 7 being the rightmost diagonal. For User 1, the column filler 62 operates to fill the symbols in the order: A1, A2, B1, B2, C1, . . . F2, G1, G2. For User 2, the column filler 62 operates to fill the symbols in the order: A3, A4, B3, A5, B4, C3, . . . . F7, G6, G7. For each of the symbols filled in by the column filler 62, the two LSBs are left empty, since these will be filled in by the group filler, explained in detail below.

In the lower level 70 of the TCM encoder, data is first collected into groups by group collector 72. Groups are consecutive diagonals that are combined. Groups are typically used to create larger TCM words, such that the complexity of the TCM decoding is reduced. In this manner, a packet can be represented as one or more groups, with each group corresponding to one or more consecutive diagonals. The group size is programmable. The group collector 72 collects successive data bits from the level splitter 58, up to the size of the group, and also outputs the number of bits in the group, i.e., Group_Size. For example, in the case of the example illustrated in FIG. 4, if for User 2, diagonals 3, 4 and 5 were considered one group, while diagonals 6 and 7 were considered a second group, group collector would divide the incoming bit stream into a first group of 21 bits and a second group of 14 bits, corresponding to the first and second groups of diagonals.

After grouping, the data is rate 1/2 convolutionally encoded (constraint length 6) by coder 74, which block encodes $Group_{13}$ Size bits. Consecutive groups are individually encoded using a tail biting method. In this way, the single LSB for each of the symbols is encoded into a bit pair, which will be inserted into the corresponding symbol in the place left open for the two LSBs by the column filler 62 discussed above. This bit pair is used to select the particular coset within a constellation and the higher order bits (upper level) are used to select the parallel transition.

Next, the group of bit pair LSB bits for an entire group is interleaved by interleaver 76 which performs block interleaving. The interleaver 76 operates on encoded bit pairs (cosets). The input to the interleaver 76 is X(n), for n=0...(N−i), where N is Group_Size. The interleaver output Y(n), with J being a programmable parameter, is similar to the output of interleaver 54, i.e.,

| X(0)   | X(J)      | X(2*J)     | ... | X(floor(N/J)*J)             |
|--------|-----------|------------|-----|-----------------------------|
| X(1)   | X(1 + J)  | X(1 + 2*J) | ... | X(1 + floor((N − 1)/J)*J)   |
| ...    |           |            |     |                             |
| X(J − 1) | X(2*J − 1) | ...    |     | X(J − 1 + floor((N − (J − 1))/J)*J) |

The data output by the interleaver 76 is assigned to a particular symbol by group filler 78. Group filling is performed in a column-wise fashion within a group. The group filler 78 assembles the encoded and interleaved cosets and assigns them to the appropriate tones. The mapping is performed in an absolute, vertical column by column approach (even if the data symbols are diagonalized according to one aspect of the present invention), proceeding from top to bottom (decreasing tone frequency). The group filling is performed along vertical columns, stopping at group boundaries. The leftmost column is filled first, and the rightmost column is filled last (increasing time). Thus, in the case of the example illustrated in FIG. 4, if the data packet for User 2 is partitioned into a first group (diagonals 3, 4 and 5) and a second group (diagonals 6 and 7), the group filler would operate to fill in the two LSBs for the symbols in the following order: A3, A4, B3, A5, B4, C3, B5, C4, D3, . . . F7, G6, G7.

The actual filling of the TCM encoded data is performed along columns; however, the interleaving essentially introduces a reversal between columns and rows, such that the effective filling of data is along rows. In addition to the reversal of columns and rows, the interleaving also introduces time separation of symbols, which is a function of the interleaver depth. The time separation of the symbols is advantageous in that it is easier for the TCM coding to deal with corrupted symbols that are not adjacent in time. As indicated above, the time separation of symbols provided by the interleaver is a function of the interleaver depth. Thus, the depth of the interleaver should be set to be at least equal to the number of rows in a group, multiplied by the expected impulse length (in symbol time periods).

As with the filling of the upper level, the overhead symbols are accounted for in the filling process. The column filler 62 operates on the MSBs of the data word, while the group filler 78 operates on the LSB's of the data word.

The outputs of the upper stream 60 and the lower stream 70 are combined into m-tuples (QAM symbols), and temporarily stored in a FIFO buffer 80. The data is then delivered from the FIFO buffer 80 to a QAM mapper 82. The FIFO buffer 80 introduces the appropriate delay required to output the m-tuples according the diagonalization principle of the present invention.

The specific example illustrated in FIG. 5 performs RS coding on the entire user data stream and then performs TCM encoding on a portion of the user data stream. Alternatively, the two level encoding approach of the present invention may be carried out such that RS encoding only is performed on a portion of the data stream and TCM encoding only is performed on the remainder of the data stream. In such an implementation, RS coder 52 and packet interleaver 54 would instead be placed in the upper level 60, between level splitter 58 and column filler 62. Scrambler 56 may be implemented prior to the level splitter, as in FIG. 5, or alternatively, it may be implemented following the packet interleaver 54 and before the column filler 62.

The two level encoding approach of the present invention, as well as the diagonalization of the present invention, may be performed separately, or they may be performed together. The diagonalization may be implemented by either the column filler 62 and group filler 78 together, or alternatively by the FIFO 80. These blocks are programmed to map the data to the appropriate symbols, to implement (or not implement) the diagonalization.

The input to the QAM mapper 82 is data in the form of m-tuples which are to be mapped into QAM symbols, for example, ranging from QPSK to 256-QAM, tone by tone. The constellation mapping may be the same as that used in ADSL. In order to randomize the overhead channel symbols, a phase scrambling sequence is applied to the output symbols. However, to simplify implementation, the phase scrambler is applied to all symbols, not just the overhead symbols. For example, the phase scrambling sequence may be generated by a pseudo-random generator composed of a linear feedback shift register of length 21, and initialized by a user programmable seed. Consecutive output pairs from the pseudo-random generator, e.g., (n, n+1), (n+2, n+3), . . . denoted (a, b) are converted into numbers 2a+b (the sum is "2a+b" because the "a" bit is the MSB, i.e., $2^1$) and the sum (2a+b) is used to select the amount of rotation to be applied to the symbol, according to the following table:

| 2a + b | | Phase Rotation |
|--------|---|----------------|
| 0 | → | 0 |
| 1 | → | +π/2 |
| 2 | → | π |
| 3 | → | −π/2 |

The diagonalization principle of the present invention utilizes the same diagonal slope for all users, taking into account trade-offs between latency and noise immunity. The minimum transmission element is a full diagonal, and appropriate data padding is utilized to result in a whole number of diagonals. Each packet may contain overhead bits (e.g., pilot tones) in addition to payload data. Although the overhead bits are not coded, they are still counted when computing the packet size and mapping the data into tones.

The output from the QAM mapper 82 is provided to a modulator (not shown) which implements the particular signal modulation desired, e.g., VCMT, CDMA, etc.

The framing scheme according to the present invention may also be performed in a CDMA system, in which case the modulator (not shown) may, for example, be a CDMA-type modulator in accordance with the TIA/EIA/IS-95 "Mobile Station Compatibility Standard for Dual Mode Wideband Spread Spectrum Cellular System". In the case of a CDMA implementation of the framing scheme according to the present invention, the TCM encoded data may be filled along rows, while the RS encoded data may be filled along columns.

The framing scheme and diagonalization scheme according to the present invention may be implemented separately or together, depending on the particular application and data transmission system. For example, in the case of a VCMT implementation utilizing both diagonalization and framing according to the present invention, the RS encoded data may be filled along columns, while the TCM encoded data is filled along diagonals.

While the invention has been particularly shown and described with reference to a preferred embodiment thereof, it will be understood by those skilled in the art that various changes in form and details may be made therein without departing from the spirit and scope of the invention.

What is claimed is:

1. A method of arranging and transmitting data in a multitone modulation system having a plurality of tones, each tone at a different frequency and adapted to transmit a data symbol during a symbol period, comprising the following steps:

inputting data comprising a plurality of data symbols;

encoding a first portion of said data according to a first error correcting code to produce first encoded data;

encoding a second portion of said data according to a second error correcting code to produce second encoded data;

arranging said first encoded data according to time-wise columns, each of said time-wise columns corresponding substantially to a symbol period;

arranging said second encoded data according to rows, wherein each row corresponds to one of said plurality of tones matching said first error correcting code, said second error correcting code, and said arranging steps to a type of noise the modulation is sensitive to; and utilizing said plurality of tones to transmit said first encoded data and said second encoded data.

2. The method of claim 1, wherein said first error correcting code is a Reed-Solomon code.

3. The method of claim 1, wherein said second error correcting code is a TCM code.

4. The method of claim 1, further comprising the following step after the first encoding step:

interleaving said first encoded data, and wherein said arranging step arranges the interleaved first encoded data.

5. A method of arranging and transmitting data in a multitone modulation system having a plurality of tones, each tone at a different frequency and adapted to transmit a data symbol during a symbol period, comprising the following steps:

inputting data comprising a plurality of data symbols;

encoding a first portion of said data according to a first error correcting code to produce first encoded data;

encoding a second portion of said data according to a second error correcting code to produce second encoded data;

arranging said first encoded data according to time-wise columns, each of said time-wise columns corresponding substantially to a symbol period;

interleaving and arranging said second encoded data such that it is spread over time;

matching said first error correcting code, said second error correcting code, and said arranging steps to a type of noise the modulation is sensitive to; and utilizing said plurality of tones to transmit said first encoded data and said second encoded data.

6. The method of claim 5, wherein said first error correcting code is a Reed-Solomon code.

7. The method of claim 5, wherein said second error correcting code is a TCM code.

8. The method of claim 5, further comprising the following step after the first encoding step:

interleaving said first encoded data, and wherein said arranging step arranges the interleaved first encoded data.

9. A method of arranging and transmitting data in a multitone system having a plurality of tones, each tone at a different frequency and adapted to transmit a data symbol during a symbol period, said tones corresponding to rows and said symbol periods corresponding to columns, comprising the following steps:

inputting data comprising a plurality of data symbols;

encoding said data according to a first error correcting code to produce first encoded data;

interleaving said first encoded data to produce an interleaved data stream;

splitting said interleaved data stream into upper level data and lower level data;

arranging said upper level data along columns;

encoding said lower level data according to a second error correcting code to produce second encoded data;

arranging said second encoded data according to rows; and utilizing said plurality of tones to transmit said upper level data and said second encoded data.

10. The method of claim 9, further comprising the step of scrambling said interleaved data prior to said splitting step.

11. The method of claim 9, wherein said splitting step operates to assign one bit of said interleaved data stream to said lower level, for each symbol of said data.

12. The method of claim 11, wherein said splitting step operates to assign the first N bits of said interleaved data stream to said lower level, in the case where said data comprises N symbols.

13. The method of claim 9, wherein after said splitting step and prior to said second encoding step, said method includes the step of arranging said lower level data into one or more groups.

14. The method of claim 9, wherein said step of arranging upper level data operates to arrange a predetermined number of bits less than a full amount of data bits in each symbol, and said step of arranging said second encoded data operates to arrange said predetermined number of bits in each symbol.

15. The method of claim 9, wherein prior to said utilizing step, said method includes the step of phase scrambling said upper level data and said second encoded data in accordance with said second encoded data.

16. A method of arranging and transmitting data in a multitone system having a plurality of tones, each tone at a different frequency and adapted to transmit a data symbol during a symbol period, said tones corresponding to rows and said symbol periods corresponding to columns, comprising the following steps:

inputting data comprising a plurality of data symbols;

encoding said data according to a first error correcting code to produce first error correcting encoded data;

interleaving said first encoded data to produce an interleaved data stream;

splitting said interleaved data stream into upper level data and lower level data;

arranging said upper level data along columns;

encoding said lower level data according to a second error correcting code to produce second encoded data;

interleaving and arranging said second encoded data such that it is spread over time; and utilizing said plurality of tones to transmit said upper level data and said second encoded data.

17. A method of arranging and transmitting data in a CDMA system having a plurality of modulation codes, each modulation code adapted to transmit a data symbol during a symbol period, comprising the following steps:

inputting data comprising a plurality of data symbols;

encoding a first portion of said data according to a first error correcting code to produce first encoded data;

encoding a second portion of said data according to a second error correcting code to produce second encoded data;

arranging said first encoded data according to time-wise columns, each of said time-wise columns corresponding substantially to a symbol period;

arranging said second encoded data according to rows, wherein each row corresponds to one of said plurality of codes;

matching said first error correcting code, said second error correcting code, and said arranging steps to a type of noise the modulation is sensitive to; and utilizing said plurality of modulation codes to transmit said first encoded data and said second encoded data.

18. The method of claim 17, wherein said first error correcting code is a Reed-Solomon code.

19. The method of claim 17, wherein said second error correcting code is a TCM code.

20. The method of claim 17, further comprising the following step after the first encoding step:

interleaving said first encoded data, and wherein said arranging step arranges the interleaved first encoded data.

21. A method of arranging and transmitting data in a CDMA system having a plurality of modulation codes, each modulation code adapted to transmit a data symbol during a symbol period, comprising the following steps:

inputting data comprising a plurality of data symbols;

encoding a first portion of said data according to a first error correcting code to produce first encoded data;

encoding a second portion of said data according to a second error correcting code to produce second encoded data;

arranging said first encoded data according to time-wise columns, each of said time-wise columns corresponding substantially to a symbol period;

interleaving and arranging said second encoded data such that it is spread over time;

matching said first error correcting code, said second error correcting code, and said arranging steps to a type of noise the modulation is sensitive to; and utilizing said plurality of modulation codes to transmit said first encoded data and said second encoded data.

22. The method of claim 21, wherein said first error correcting code is a Reed-Solomon code.

23. The method of claim 21, wherein said second error correcting code is a TCM code.

24. The method of claim 21, further comprising the following step after the first encoding step:

interleaving said first encoded data, and wherein said arranging step arranges the interleaved first encoded data.

25. A method of arranging and transmitting data in a CDMA system having a plurality of modulation codes, each modulation code adapted to transmit a data symbol during a symbol period, said modulation codes corresponding to rows and said symbol periods corresponding to columns, comprising the following steps:

inputting data comprising a plurality of data symbols;

encoding said data according to a first error correcting code to produce first encoded data;

interleaving said first encoded data to produce an interleaved data stream;

splitting said interleaved data stream into upper level data and lower level data;

arranging said upper level data along columns; encoding said lower level data according to a second error correcting code to produce second encoded data;

arranging said second encoded data according to rows; and utilizing said plurality of modulation codes to transmit said upper level data and said second encoded data.

26. The method of claim 25, further comprising the step of scrambling said interleaved data prior to said splitting step.

27. The method of claim 25, wherein said splitting step operates to assign one bit of said interleaved data stream to said lower level, for each symbol of said data.

28. The method of claim 27, wherein said splitting step operates to assign the first N bits of said interleaved data stream to said lower level, in the case where said data comprises N symbols.

29. The method of claim 25, wherein after said splitting step and prior to said second encoding step, said method includes the step of arranging said lower level data into one or more groups.

30. The method of claim 25, wherein said step of arranging upper level data operates to arrange a predetermined number of bits less than a full amount of data bits in each symbol, and said step of arranging said second encoded data operates to arrange said predetermined number of bits in each symbol.

31. The method of claim 25, wherein prior to said utilizing step, said method includes the step of phase scrambling said upper level data and said second encoded data in accordance with said second encoded data.

32. A method of arranging and transmitting data in a CDMA system having a plurality of modulation codes, each modulation code adapted to transmit a data symbol during a symbol period, said modulation codes corresponding to rows and said symbol periods corresponding to columns, comprising the following steps:

inputting data comprising a plurality of data symbols;

encoding said data according to a first error correcting code to produce first encoded data;

interleaving said first encoded data to produce an interleaved data stream;

splitting said interleaved data stream into upper level data and lower level data;

arranging said upper level data along columns;

encoding said lower level data according to a second error correcting code to produce second encoded data;

interleaving and arranging said second encoded data such that it is spread over time; and utilizing said plurality of modulation codes to transmit said upper level data and said second encoded data.

33. The method of claim 7 wherein the step of interleaving and arranging arranges the second encoded data according to one of rows and columns.

34. An apparatus for arranging and transmitting data in a multitone modulation system having a plurality of tones, each tone at a different frequency and adapted to transmit a data symbol during a symbol period, comprising:

means for inputting data comprising a plurality of data symbols;

means for encoding a first portion of said data according to a first error correcting code to produce first encoded data;

means for encoding a second portion of said data according to a second error correcting code to produce second encoded data;

means for arranging said first encoded data according to time-wise columns, each of said time-wise columns corresponding substantially to a symbol period;

means for arranging said second encoded data according to rows, wherein each row corresponds to one of said plurality of tones;

means for matching said first error correcting code, said second error correcting code, and said means for arranging to a type of noise the modulation is sensitive to; and means for utilizing said plurality of tones to transmit said first encoded data and said second encoded data.

35. An apparatus for arranging and transmitting data in a multitone modulation system having a plurality of tones, each tone at a different frequency and adapted to transmit a data symbol during a symbol period, comprising:

means for inputting data comprising a plurality of data symbols;

means for encoding a first portion of said data according to a first error correcting code to produce first encoded data;

means for encoding a second portion of said data according to a second error correcting code to produce second encoded data;

means for arranging said first encoded data according to time-wise columns, each of said time-wise columns corresponding substantially to a symbol period;

means for interleaving and arranging said second encoded data such that it is spread over time;

means for matching said first error correcting code, said second error correcting code, and said means for arranging to a type of noise the modulation is sensitive to; and means for utilizing said plurality of tones to transmit said first encoded data and said second encoded data.

36. An apparatus for arranging and transmitting data in a multitone system having a plurality of tones, each tone at a different frequency and adapted to transmit a data symbol during a symbol period, said tones corresponding to rows and said symbol periods corresponding to columns, comprising:

means for inputting data comprising a plurality of data symbols;

means for encoding said data according to a first error correcting code to produce first encoded data;

means for interleaving said first encoded data to produce an interleaved data stream;

means for splitting said interleaved data stream into upper level data and lower level data;

means for arranging said upper level data along columns;

means for encoding said lower level data according to a second error correcting code to produce second encoded data;

means for arranging said second encoded data according to rows; and means for utilizing said plurality of tones to transmit said upper level data and said second encoded data.

37. An apparatus for arranging and transmitting data in a multitone system having a plurality of tones, each tone at a different frequency and adapted to transmit a data symbol during a symbol period, said tones corresponding to rows and said symbol periods corresponding to columns, comprising:

means for inputting data comprising a plurality of data symbols;

means for encoding said data according to a first code to produce first error correcting encoded data;

means for interleaving said first encoded data to produce an interleaved data stream;

means for splitting said interleaved data stream into upper level data and lower level data;

means for arranging said upper level data along columns;

means for encoding said lower level data according to a second error correcting code to produce second encoded data;

means for interleaving and arranging said second encoded data such that it is spread over time; and means for utilizing said plurality of tones to transmit said upper level data and said second encoded data.

38. An apparatus for arranging and transmitting data in a CDMA system having a plurality of modulation codes, each modulation code adapted to transmit a data symbol during a symbol period, comprising:

means for inputting data comprising a plurality of data symbols;

means for encoding a first portion of said data according to a first error correcting code to produce first encoded data;

means for encoding a second portion of said data according to a second error correcting code to produce second encoded data;

means for arranging said first encoded data according to time-wise columns, each of said time-wise columns corresponding substantially to a symbol period;

means for arranging said second encoded data according to rows, wherein each row corresponds to one of said plurality of codes;

means for matching said first error correcting code, said second error correcting code, and said means for arranging to a type of noise the modulation is sensitive to; and means for utilizing said plurality of modulation codes to transmit said first encoded data and said second encoded data.

39. An apparatus for arranging and transmitting data in a CDMA system having a plurality of modulation codes, each modulation code adapted to transmit a data symbol during a symbol period, comprising:

means for inputting data comprising a plurality of data symbols;

means for encoding a first portion of said data according to a first error correcting code to produce first encoded data;

means for encoding a second portion of said data according to a second error correcting code to produce second encoded data;

means for arranging said first encoded data according to time-wise columns, each of said time-wise columns corresponding substantially to a symbol period;

means for interleaving and arranging said second encoded data such that it is spread over time;

means for matching said first error correcting code, said second error correcting code, and said means for arranging to a type of noise the modulation is sensitive to; and means for utilizing said plurality of modulation codes to transmit said first encoded data and said second encoded data.

40. An apparatus for arranging and transmitting data in a CDMA system having a plurality of modulation codes, each modulation code adapted to transmit a data symbol during a symbol period, said modulation codes corresponding to rows and said symbol periods corresponding to columns, comprising:

means for inputting data comprising a plurality of data symbols;

means for encoding said data according to a first error correcting code to produce first encoded data;

means for interleaving said first encoded data to produce an interleaved data stream;

means for splitting said interleaved data stream into upper level data and lower level data;

means for arranging said upper level data along columns;

means for encoding said lower level data according to a second error correcting code to produce second encoded data;

means for arranging said second encoded data according to rows; and means for utilizing said plurality of modulation codes to transmit said upper level data and said second encoded data.

41. An apparatus for arranging and transmitting data in a CDMA system having a plurality of modulation codes, each modulation code adapted to transmit a data symbol during a symbol period, said modulation codes corresponding to rows and said symbol periods corresponding to columns, comprising:

means for inputting data comprising a plurality of data symbols;

means for encoding said data according to a first error correcting code to produce first encoded data;

means for interleaving said first encoded data to produce an interleaved data stream;

means for splitting said interleaved data stream into upper level data and lower level data;

means for arranging said upper level data along columns;

means for encoding said lower level data according to a second error correcting code to produce second encoded data;

means for interleaving and arranging said second encoded data such that it is spread over time; and means for utilizing said plurality of modulation codes to transmit said upper level data and said second encoded data.

42. A method of transmitting data of at least two users to provide inter-user interleaving in a multitone modulation system having a plurality of tones, each tone at a different frequency and adapted to transmit a data symbol during a symbol period, the method comprising the following steps:

inputting user data comprising a plurality of data symbols;

encoding a first portion of said user data according to a first code to produce first encoded data;

encoding a second portion of said user data according to a second code to produce second encoded data, said first and second codes being different;

arranging said first encoded data according to time-wise columns of symbols to be transmitted, each of said time-wise columns corresponding substantially to a symbol period;

arranging said second encoded data according to rows of symbols to be transmitted, wherein each row corresponds to one of said plurality of tones;

matching said first error correcting code, said second error correcting code, and said arranging steps to a type of noise the modulation is sensitive to;

delaying the transmission of successive ones of said symbols to be transmitted; and utilizing said plurality of tones to transmit the symbols to be transmitted.

* * * * *